(12) United States Patent
Moore (10) Patent No.: US 8,129,630 B2
(45) Date of Patent: Mar. 6, 2012

(54) ANGULAR SEAM FOR AN ELECTRONIC MODULE

(75) Inventor: Joshua Moore, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 795 days.

(21) Appl. No.: 12/038,721

(22) Filed: Feb. 27, 2008

(65) Prior Publication Data

US 2008/0205893 A1    Aug. 28, 2008

Related U.S. Application Data

(60) Provisional application No. 60/892,199, filed on Feb. 28, 2007.

(51) Int. Cl.
*H05K 9/00* (2006.01)

(52) U.S. Cl. ..................................... 174/384; 439/607.2

(58) Field of Classification Search .................. 174/377, 174/382, 384; 361/816, 818; 439/607.2
See application file for complete search history.

(56) References Cited

U.S. PATENT DOCUMENTS

| | | | |
|---|---|---|---|
| 4,327,482 A | 5/1982 | Araki et al. | |
| 5,621,311 A * | 4/1997 | Kamiya | ........................ 324/156 |
| 6,047,874 A | 4/2000 | Asai et al. | |
| 6,409,159 B1 | 6/2002 | Asai et al. | |
| 6,671,450 B2 | 12/2003 | Khan et al. | |
| 6,744,639 B1 | 6/2004 | Branch et al. | |
| 7,275,937 B2 | 10/2007 | Ellison | |
| 7,287,916 B2 | 10/2007 | Mizue | |
| 7,306,377 B2 | 12/2007 | Ellison | |
| 7,309,170 B2 | 12/2007 | Ice | |
| 2002/0110336 A1 | 8/2002 | Adair et al. | |
| 2003/0171022 A1 | 9/2003 | Distad et al. | |
| 2004/0037517 A1 | 2/2004 | Dair et al. | |
| 2004/0151443 A1 | 8/2004 | Mizue | |
| 2006/0140552 A1 | 6/2006 | Mizue et al. | |
| 2006/0215968 A1 | 9/2006 | Kayner et al. | |
| 2006/0215970 A1 | 9/2006 | Mizue et al. | |
| 2007/0117458 A1 | 5/2007 | Winker et al. | |
| 2007/0189673 A1 | 8/2007 | Yoshikawa | |
| 2007/0237466 A1 | 10/2007 | Togami et al. | |
| 2008/0078576 A1* | 4/2008 | Blacker et al. | ................. 174/388 |
| 2008/0233799 A1* | 9/2008 | Winker et al. | ................. 439/607 |

FOREIGN PATENT DOCUMENTS

| | | |
|---|---|---|
| JP | 04-250419 | 9/1992 |
| JP | 11-150154 | 6/1999 |
| KR | 10-2004-0072926 | 8/2004 |
| KR | 10-2005-0038504 | 4/2005 |

OTHER PUBLICATIONS

Moore, Joshua et al., Collar Clip for an Electronic Module, U.S. Appl. No. 12/038,689, filed Feb. 27, 2008.

Moore, Joshua et al., Positioning Plate for Optical Subassembly, U.S. Appl. No. 12/039,598, filed Feb. 28, 2008.

(Continued)

*Primary Examiner* — Hung Ngo (74) *Attorney, Agent, or Firm* — Maschoff Gilmore & Israelsen (57) ABSTRACT

In one example embodiment, an angular seam includes a first complementary structure defined in a first shell of an optoelectronic transceiver module, and a second complementary structure defined in a second shell of the optoelectronic transceiver module. The second complementary structure is configured to receive the first complementary structure so that an angular seam is defined that is substantially non-transmissive to electromagnetic radiation.

11 Claims, 6 Drawing Sheets

OTHER PUBLICATIONS

Moore, Joshua et al., Rotatable Top Shell, U.S. Appl. No. 12/039,677, filed Feb. 28, 2008.
Moore, Joshua et al, Printed Circuit Board Positioning Mechanism, U.S. Appl. No. 12/038,708, filed Feb. 27, 2008.
Moore, Joshua, Optical Subassembly Positioning Device for an Electronic Module, U.S. Appl. No. 12/038,784, filed Feb. 27, 2008.
U.S. Appl. No. 12/038,784, Sep. 8, 2008, Notice of Allowance.
U.S. Appl. No. 12/038,708, Jun. 23, 2008, Office Action.
U.S. Appl. No. 12/038,708, Nov. 12, 2008, Notice of Allowance.
U.S. Appl. No. 12/039,598, Oct. 7, 2009, Notice of Allowance.
U.S. Appl. No. 12/038,689, Mar. 23, 2009, Notice of Allowance.
U.S. Appl. No. 12/038,708, Sep. 19, 2008, Interview Summary.

* cited by examiner

ANGULAR SEAM FOR AN ELECTRONIC MODULE

CROSS REFERENCE TO A RELATED APPLICATION

The present application claims priority to U.S. Provisional Patent Application Ser. No. 60/892,199, filed Feb. 28, 2007 and entitled "Electronic Module Mechanical Systems," which is incorporated herein by reference in its entirety.

BACKGROUND

Electronic modules, such as electronic or optoelectronic transceiver or transponder modules, are increasingly used in electronic and optoelectronic communication. Electronic modules typically communicate with a printed circuit board of a host device by transmitting electrical signals to the printed circuit board and receiving electrical signals from the printed circuit board. These electrical signals can then be transmitted by the electronic module outside the host device as optical and/or electrical signals.

One common difficulty associated with the operation of electronic modules is the generation of electromagnetic radiation. The generation of electromagnetic radiation by an electronic module is a matter of significant concern because such electromagnetic radiation can cause electromagnetic interference (EMI) with other systems and devices in the vicinity, which can seriously impair, if not prevent, the proper operation of those other systems and devices. Thus, the control of EMI effects is an important consideration in the design and use of electronic modules.

SUMMARY OF SOME EXAMPLE EMBODIMENTS

In general, example embodiments of the invention relate to an angular seam within an electronic module. Some example embodiments of the angular seam can help reduce the probability that electromagnetic radiation generated within the electronic module will escape the electronic module and cause electromagnetic interference (EMI) in surrounding devices.

In one example embodiment, an angular seam includes a first complementary structure defined in a first shell of an optoelectronic transceiver module and a second complementary structure defined in a second shell of the optoelectronic transceiver module. The second complementary structure is configured to receive the first complementary structure so that an angular seam is defined that is substantially non-transmissive to electromagnetic radiation.

In another example embodiment, an optoelectronic transceiver module shell includes a bottom shell defining a post and a top shell defining a pocket. The pocket is configured to receive the post so that an angular seam is defined that is substantially non-transmissive to electromagnetic interference.

In yet another example embodiment, an optoelectronic transceiver module includes a multi-piece shell, a PCB at least partially positioned within the multi-piece shell, a TOSA electrically connected to the PCB, and a ROSA electrically connected to the PCB. The multi-piece shell includes a bottom shell defining a post and a top shell defining a pocket. The pocket is configured to receive the post so that an angular seam is defined that is substantially non-transmissive to electromagnetic interference.

These and other aspects of example embodiments of the invention will become more fully apparent from the following description and appended claims.

BRIEF DESCRIPTION OF THE DRAWINGS

To further clarify certain aspects of the present invention, a more particular description of the invention will be rendered by reference to example embodiments thereof which are disclosed in the appended drawings. It is appreciated that these drawings depict only example embodiments of the invention and are therefore not to be considered limiting of its scope. Aspects of the invention will be described and explained with additional specificity and detail through the use of the accompanying drawings in which.

DETAILED DESCRIPTION OF SOME EXAMPLE EMBODIMENTS

Example embodiments disclosed herein relate to an angular seam within an electronic module. Some example embodiments of the angular seam can help reduce the probability that electromagnetic radiation generated within the electronic module will escape the electronic module and cause electromagnetic interference (EMI) in surrounding devices.

Reference will now be made to the drawings to describe various aspects of some example embodiments of the invention. It is to be understood that the drawings are diagrammatic and schematic representations of such example embodiments, and are not limiting of the present invention, nor are they necessarily drawn to scale.

1. Example Optoelectronic Transceiver Module

Figure 1A:
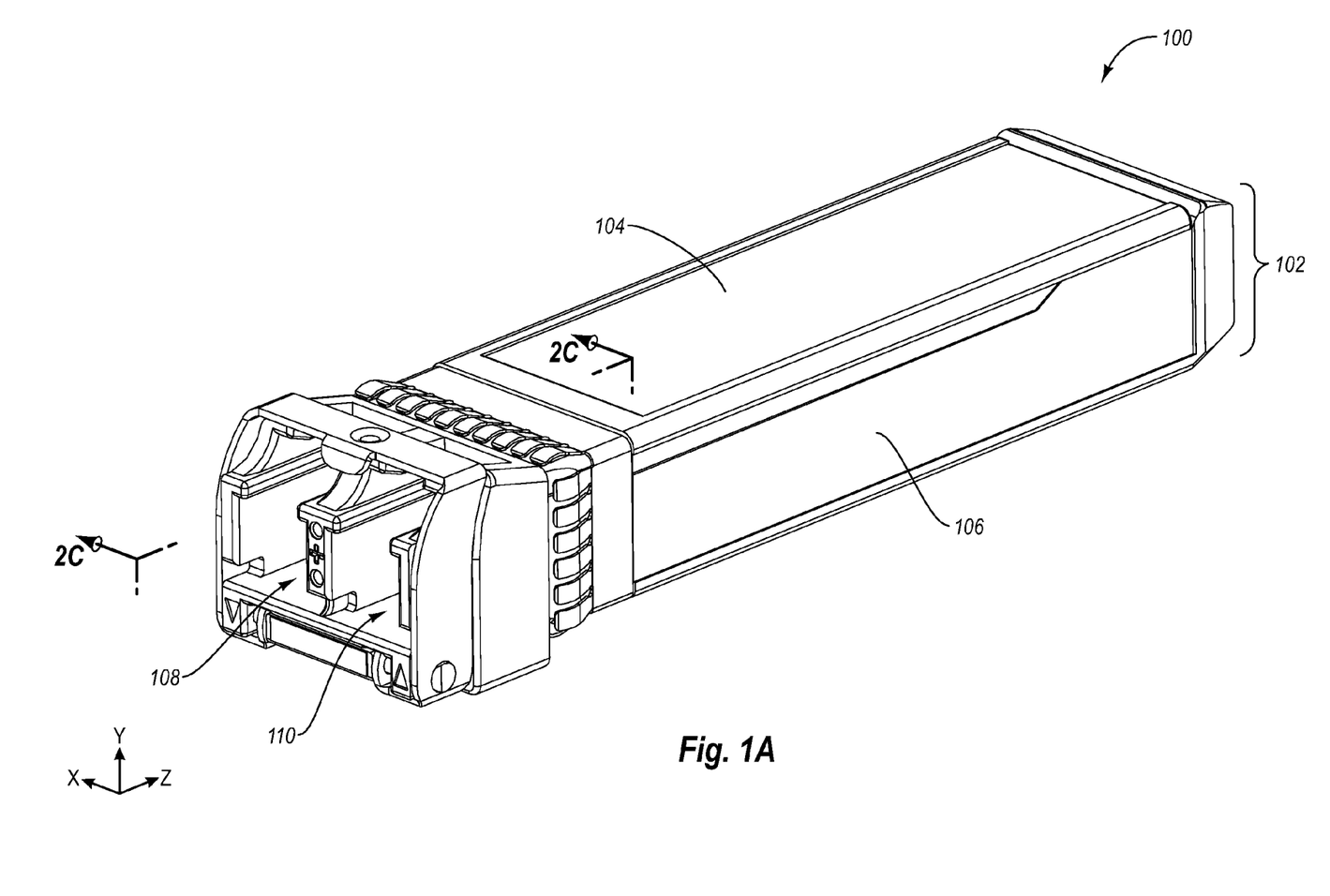
FIG. 1A is a top perspective view of an example optoelectronic transceiver module.
Figure 1B:
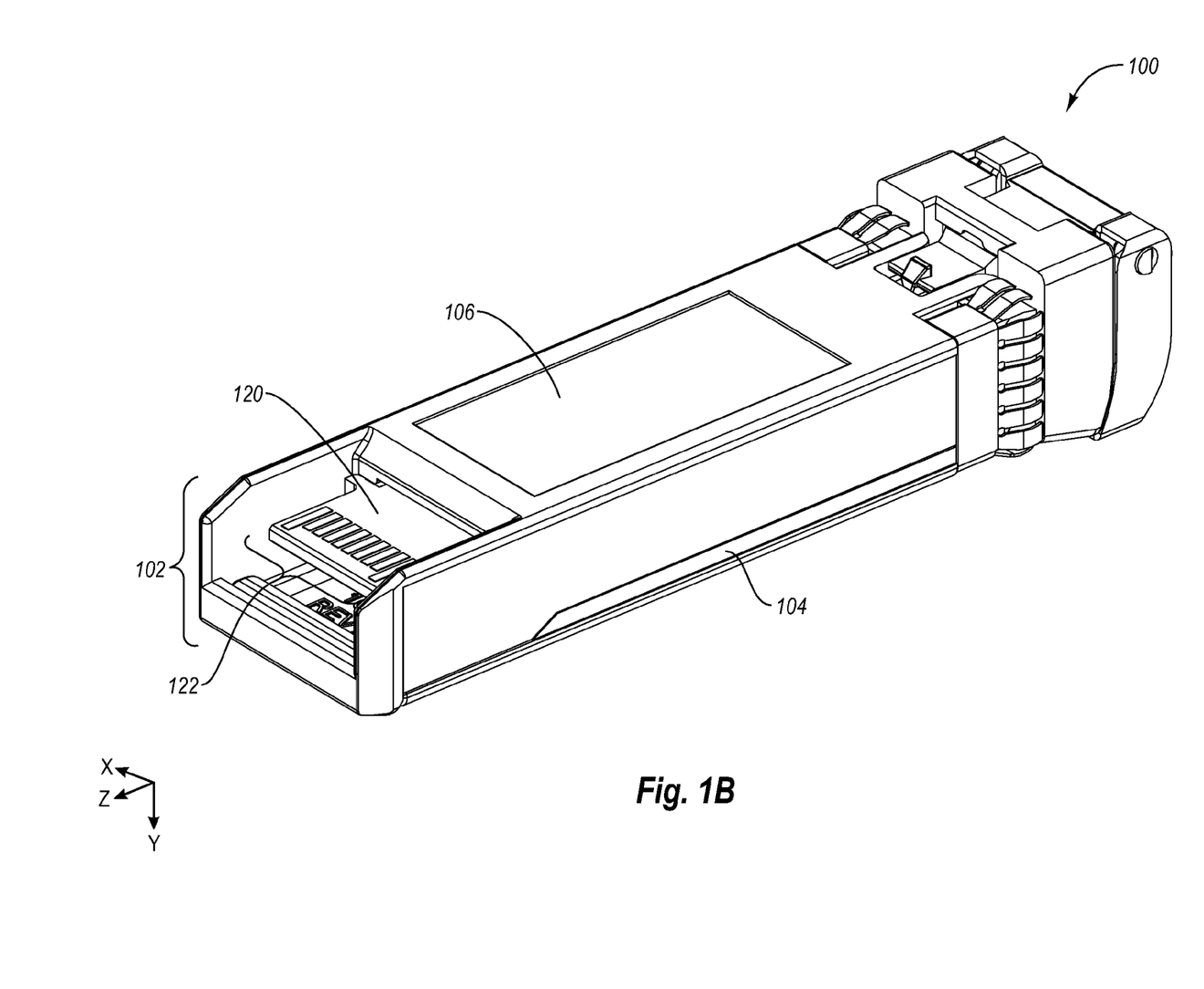
FIG. 1B is a bottom perspective view of the example optoelectronic transceiver module of FIG. 1A.
Figure 1C:
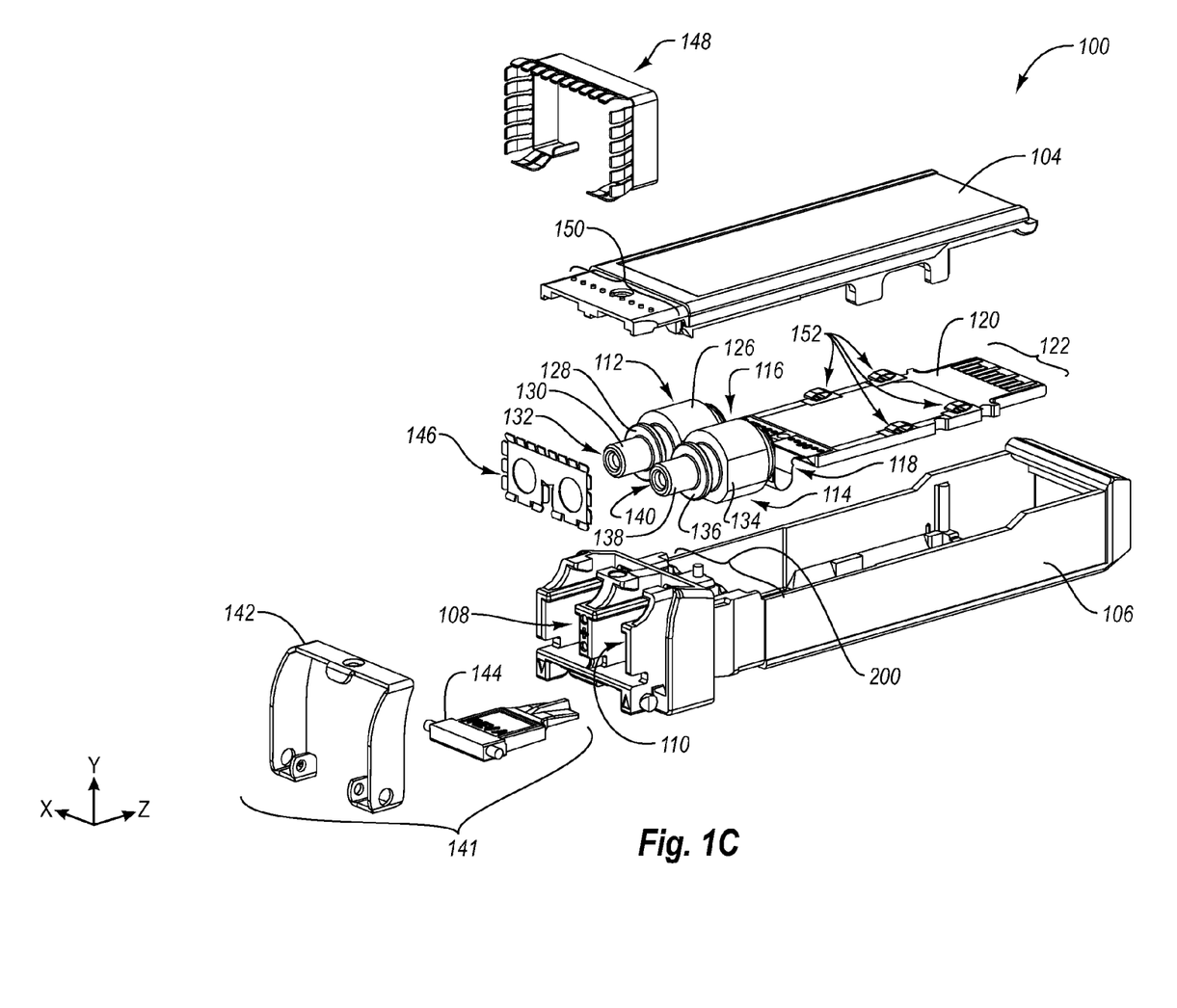
FIG. 1C is an exploded perspective view of the example optoelectronic transceiver module of FIG. 1A.

Reference is first made to FIGS. 1A-1C which disclose aspects of an example optoelectronic transceiver module 100 for use in transmitting and receiving optical signals in connection with a host device (not shown). As disclosed in FIGS. 1A and 1B, the optoelectronic transceiver module 100 comprises various components, including a shell 102 that includes a top shell 104 rotatably attached to a bottom shell 106. An output port 108 and an input port 110 are defined in the bottom shell 106. The top shell 104 and the bottom shell 106 can be formed using a die casting process, machining operation, or any other suitable process(es). One example material from which the top shell 104 and the bottom shell 106 can be die cast is zinc, although the top shell 104 and the bottom shell 106 may alternatively be die cast or otherwise constructed from other suitable materials such as aluminum, or any other suitable material(s).

As disclosed in FIG. 1C, the example optoelectronic transceiver module 100 also includes a transmitter optical subassembly (TOSA) 112, a receiver optical subassembly (ROSA) 114, electrical interfaces 116 and 118, and a printed circuit board (PCB) 120 having an edge connector 122. The two electrical interfaces 116 and 118 are used to electrically connect the TOSA 112 and the ROSA 114, respectively, to the PCB 120.

The TOSA 112 of the optoelectronic transceiver module 100 includes a barrel 126 within which an optical transmitter, such as a laser (not shown), is disposed. The optical transmitter is configured to convert electrical signals received through the PCB 120 from a host device (not shown) into corresponding optical signals. The TOSA 112 also includes a flange 128 and a nose piece 130. The nose piece 130 defines a port 132. The port 132 is configured to optically connect the optical transmitter disposed within the barrel 126 with a fiber-ferrule (not shown) removably received within the output port 108.

Similarly, the ROSA 114 of the optoelectronic transceiver module 100 includes a barrel 134, a flange 136, and a nose piece 138. The nose piece 138 defines a port 140. The port 140 is configured to optically connect an optical receiver, such as a photodiode (not shown), disposed within the barrel 134 to a fiber-ferrule (not shown) disposed within the input port 110. The optical receiver is configured to convert optical signals received from the fiber-ferrule into corresponding electrical signals for transmission to a host device (not shown) through the PCB 120.

The optoelectronic transceiver module 100 can be configured for optical signal transmission and reception at a variety of per-second data rates including, but not limited to, 1 Gbit, 2 Gbit, 2.5 Gbit, 4 Gbit, 8 Gbit, 10 Gbit, 17 Gbit, 40 Gbit, 100 Gbit, or higher. Furthermore, the optoelectronic transceiver module 100 can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Further, the optoelectronic transceiver module 100 can be configured to support various communication standards including, but not limited to, Fast Ethernet, Gigabit Ethernet, 10 Gigabit Ethernet, and 1×, 2×, 4×, and 10× Fibre Channel. In addition, although one example of the optoelectronic transceiver module 100 is configured to have a form factor that is substantially compliant with the SFP+(IPF) MSA, the optoelectronic transceiver module 100 can alternatively be configured to have a variety of different form factors that are substantially compliant with other MSAs including, but not limited to, the SFF MSA or the SFP MSA.

With continued reference to FIG. 1C, the optoelectronic transceiver module 100 also includes a latching mechanism 141 which includes a bail 142 and a latch 144. The optoelectronic transceiver module 100 further includes an optical subassembly (OSA) positioning plate 146, a collar clip 148, an interlocking seam 150, four PCB positioning mechanisms 152, and an angular seam 200. Aspects of example embodiments of the angular seem 200 will be discussed in greater detail below in connection with FIGS. 2A-2C.

2. Example Angular Seam

Figure 2A:
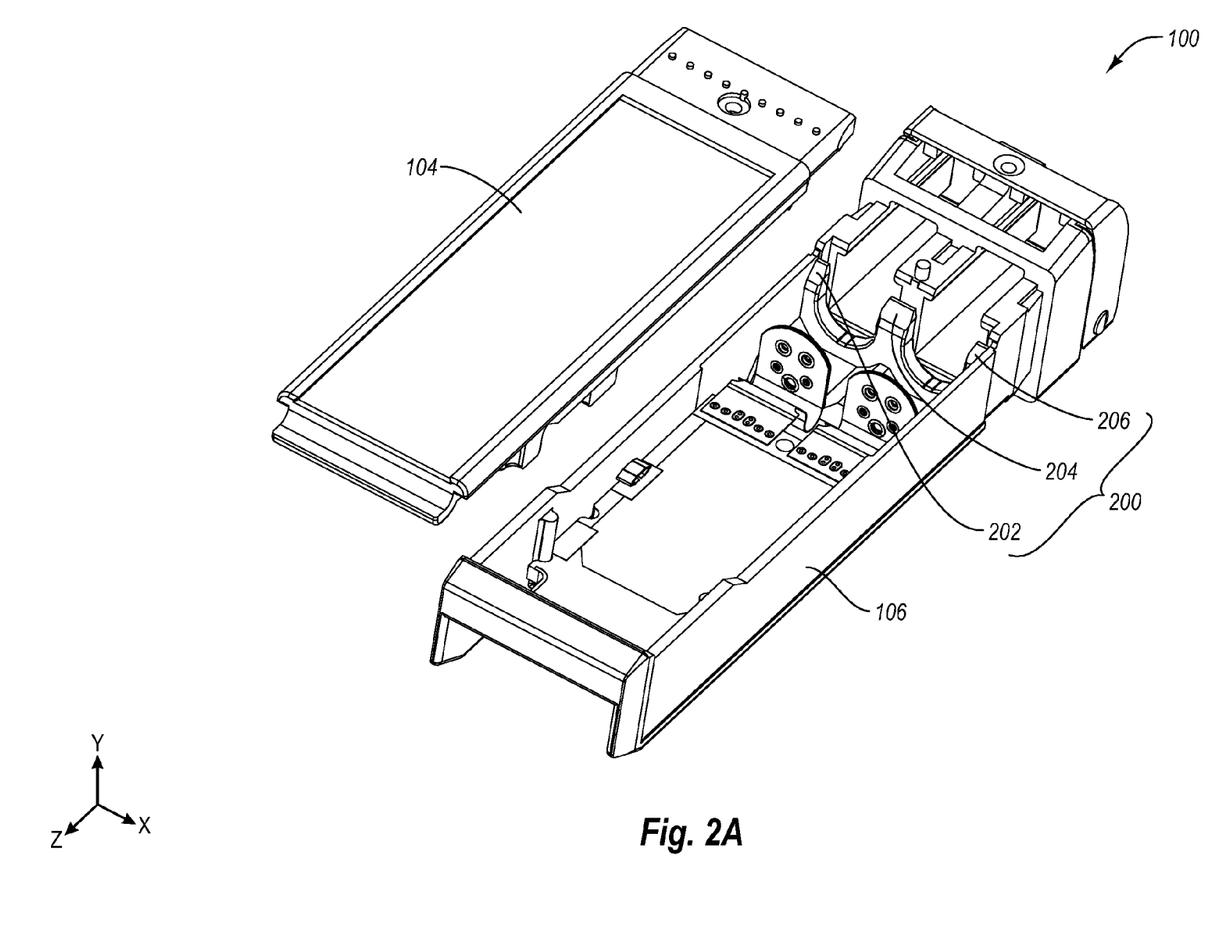
FIG. 2A is an exploded top perspective view of the example optoelectronic transceiver module of FIG. 1A.
Figure 2B:
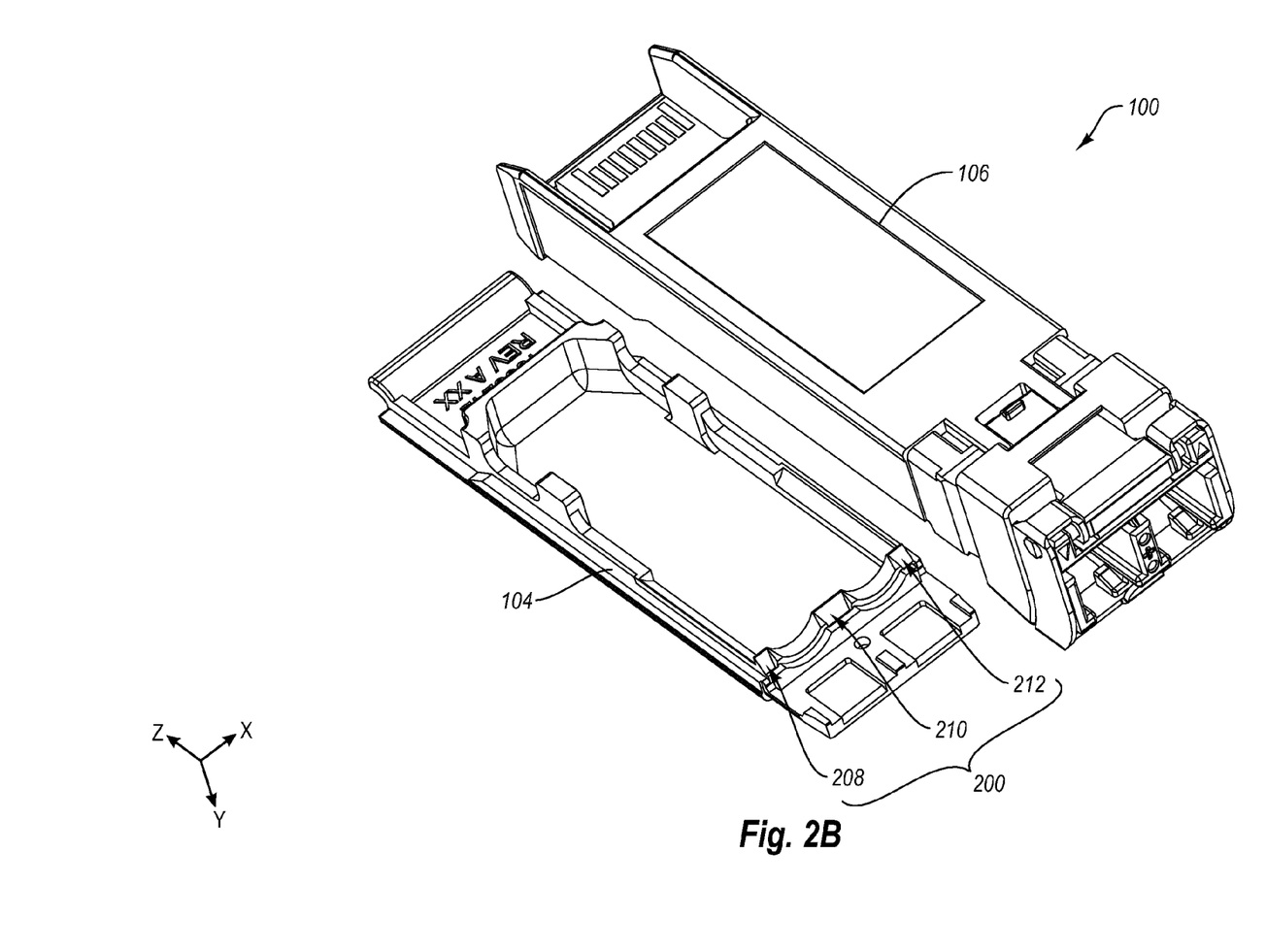
FIG. 2B is an exploded bottom perspective view of the example optoelectronic transceiver module of FIG. 1A.
Figure 2C:
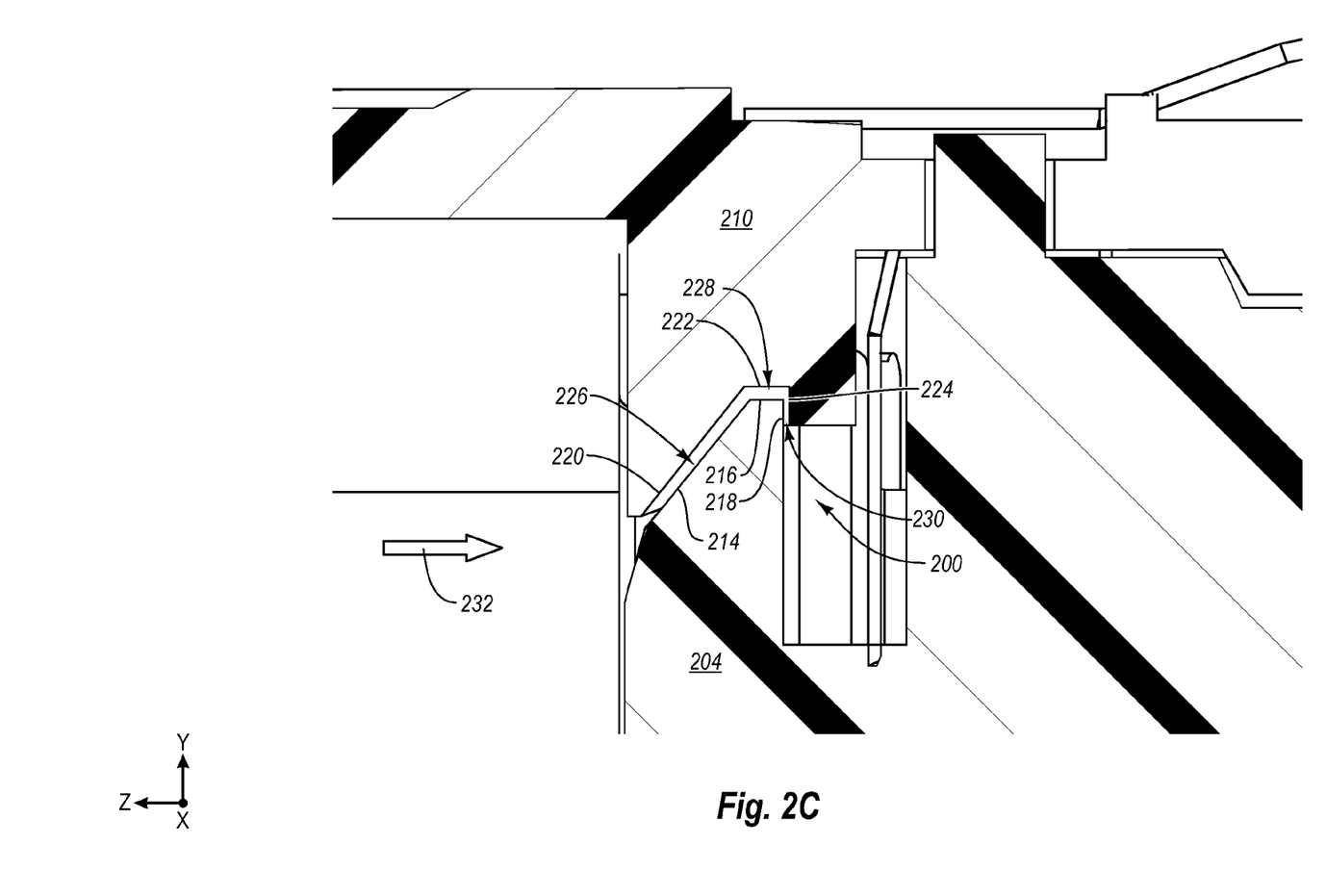
FIG. 2C is a cross-sectional side view of a portion of the example optoelectronic transceiver module of FIG. 1A.

With reference now to FIGS. 2A-2C, aspects of an example angular seam 200 are disclosed. As disclosed in FIG. 2A, posts 202-206 are defined in the bottom shell 106. The posts 202-206 are sized and positioned such that the TOSA 112 can be positioned between the posts 202 and 206 and the ROSA 114 can be positioned between the posts 204 and 206. As disclosed in FIG. 2B, pockets 208-212 are defined in the top shell 104. As disclosed in FIG. 2C, when the top shell 104 is attached to the bottom shell 106, the posts 202-206 and the pockets 208-212 collectively define the example angular seam 200 as the posts 202-206 are received by the pockets 208-212, respectively.

It is understood that the terms "top shell" and "bottom shell" are used herein for convenience and are not limited to a particular module configuration or orientation. It is further understood that by turning the optoelectronic transceiver module 100 over, the top shell 104 may be considered a "bottom shell" and the bottom shell 106 may be considered a "top shell." The positions of the posts 202-206 and the pockets 208-212 may therefore be switched and/or the orientation of the optoelectronic transceiver module 100 may be reconfigured without affecting the function of the example angular seam 200.

With particular reference again to FIG. 2C, a cross-section of one portion of the example angular seam 200 is disclosed. As used herein, the term "angular seam" includes any seam having a non-linear path between the adjoining pieces that make up the seam. An "angular seam" can be implemented, for example, by forming a path with one or more angles and/or one or more curved-portions, or any other non-linear arrangement that would thwart the passage of radiation. Although an "angular seam" includes a non-linear path, this does not preclude a portion or portions of the path through the seam from being linear.

FIG. 2C discloses a cross-section, taken along the z-axis, of the post 204 received in the pocket 210. The cross-sections of the post 202 received in the pocket 208 (not shown) and the post 206 received in the pocket 212 (not shown) can be substantially the same as the cross-section disclosed in FIG. 2C.

As disclosed in FIG. 2C, the post 204 includes surfaces 214, 216, and 218 located proximate surfaces 220, 222, and 224, respectively, of the pocket 212. In this example, the surfaces 214 and 220 create a gap 226 that intersects the x-z plane of the optoelectronic transceiver module 100 at an angle of about 45 degrees. Similarly, the surfaces 216 and 222 create a gap 228 that intersects the gap 226 at an angle of about 45 degrees. Finally, the surfaces 218 and 224 create a gap 230 that intersects the gap 228 an angle of about 90 degrees. Although the angles between the surfaces 214-218 and between the surfaces 220-224 are disclosed in FIG. 2C as sharp angles, it is understood that these angles could instead be more gradual angles or curves. Further, although the surfaces 214-224 are disclosed in FIG. 2C as being substantially flat surfaces, it is understood that one or more of the surfaces 214-224 may be curved.

It is noted that different angular configurations of the posts 202-206 and the pockets 208-212 are contemplated as within the scope of the present invention. Therefore, an angular seam 200 involving more or less than three angled gaps of various angles are contemplated alternative embodiments to the example angular seam disclosed in FIG. 2C. Further, the angular seam 200 is not limited to the specific structures disclosed in FIGS. 2A-2C. Any other equivalent complimentary structures that define a non-linear path can form the angular seam 200.

As disclosed in FIG. 2C, electromagnetic radiation 232 generated within the optoelectronic transceiver module 100 often tends to travel toward the example angular seam 200 in either an x-z plane or a z-y plane of the optoelectronic transceiver module 100. However, as disclosed in FIG. 2C, electromagnetic radiation 232 traveling in an x-z plane or a y-z plane of the optoelectronic transceiver module 100 would have to change direction by about 45 degrees to travel through the gap 226, then change direction again by about another 45 degrees to travel through the gap 228, then finally change direction yet again by about another 90 degrees to travel through the gap 230. Thus, the probability that electromagnetic radiation 232 generated within the optoelectronic transceiver module 100 will successfully transit all the gaps 226, 228, and 230 of the angular seam 200 is negligible. As a result, the angular seam 200 is substantially non-transmissive to electromagnetic radiation 232 generated within the optoelectronic transceiver module 100.

What is claimed is:

1. An optoelectronic transceiver module shell comprising:
   a bottom shell defining a post; and
   a top shell defining a pocket, the pocket being configured to receive the post so that an angular seam is defined that is substantially non-transmissive to electromagnetic interference, wherein the post defines first, second, and third surfaces, and the pocket defines first, second, and third surfaces that are substantially parallel to the first, second, and third surfaces of the post, respectively, wherein the first surface of the post and the first surface of the pocket create a first gap that intersects the x-z plane of the optoelectronic transceiver module at an angle of about 45 degrees.

2. The optoelectronic transceiver module shell as recited in claim 1, wherein:
   the bottom shell further defines a second post; and
   the top shell further defines a second pocket, the second pocket being configured to receive the second post so that an angular seam is defined that is substantially non-transmissive to electromagnetic radiation.

3. The optoelectronic transceiver module shell as recited in claim 2, wherein:
   the bottom shell further defines a third post; and
   the top shell further defines a third pocket, the third pocket being configured to receive the third post so that an angular seam is defined that is substantially non-transmissive to electromagnetic radiation.

4. The optoelectronic transceiver module shell as recited in claim 1, wherein the second surface of the post and the second surface of the pocket create a second gap that intersects the first gap at an angle of about 45 degrees.

5. The optoelectronic transceiver module shell as recited in claim 4, wherein the third surface of the post and the third surface of the pocket create a third gap that intersects the second gap at an angle of about 90 degrees.

6. An optoelectronic transceiver module comprising:
   a multi-piece shell comprising:
      a bottom shell defining a post; and
      a top shell defining a pocket, the pocket being configured to receive the post so that an angular seam is defined that is substantially non-transmissive to electromagnetic interference;
   a printed circuit board (PCB) at least partially positioned within the multi-piece shell;
   a transmitter optical subassembly (TOSA) electrically connected to the PCB; and
   a receiver optical subassembly (ROSA) electrically connected to the PCB.

7. The optoelectronic transceiver module as recited in claim 6, wherein the post is posited between the TOSA and the ROSA.

8. The optoelectronic transceiver module as recited in claim 6, wherein the optoelectronic transceiver module is substantially compliant with the SFP+(IPF) MSA.

9. The optoelectronic transceiver module shell as recited in claim 6, wherein:
   the post defines a first surface and a second surface; and
   the pocket defines a first surface and a second surface that are substantially parallel to the first surface and the second surface of the post, respectively.

10. The optoelectronic transceiver module shell as recited in claim 9, wherein the first surface of the post and the first surface of the pocket create a first gap that intersects the x-z plane of the optoelectronic transceiver module at an angle between about 30 degrees and about 60 degrees.

11. The optoelectronic transceiver module shell as recited in claim 10, wherein the second surface of the post and the second surface of the pocket create a second gap that intersects the first gap at an angle between about 30 degrees and about 60 degrees.

* * * * *